(12) United States Patent
Lee

(10) Patent No.: US 11,992,984 B2
(45) Date of Patent: May 28, 2024

(54) APPARATUS FOR MANUFACTURING VEHICLE CARD KEY AND METHOD OF MANUFACTURING VEHICLE CARD KEY USING THE SAME

(71) Applicant: Hyundai Mobis Co., Ltd., Seoul (KR)

(72) Inventor: Sang Gwon Lee, Icheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 67 days.

(21) Appl. No.: 16/547,816

(22) Filed: Aug. 22, 2019

(65) Prior Publication Data

US 2020/0070390 A1 Mar. 5, 2020

(30) Foreign Application Priority Data

Sep. 5, 2018 (KR) .......................... 10-2018-0105846

(51) Int. Cl.
*B29C 45/14* (2006.01)
*B29C 45/26* (2006.01)
*B29L 31/34* (2006.01)

(52) U.S. Cl.
CPC ........ *B29C 45/14065* (2013.01); *B29C 45/26* (2013.01); *B29C 2045/14147* (2013.01); *B29L 2031/34* (2013.01)

(58) Field of Classification Search
CPC .............. B29C 45/14065; B29C 45/26; B29C 2045/14147; B29C 41/20; B29C 45/33; B29C 45/44; B29L 2031/34
See application file for complete search history.

(56) References Cited

U.S. PATENT DOCUMENTS

| 5,407,344 A | * | 4/1995 | Rombalski, Jr. ............................ B29C 45/14065 264/318 |
| 7,258,154 B2 | * | 8/2007 | Yamaguchi ............ B22D 17/24 164/112 |
| 8,550,364 B2 | | 10/2013 | Sugimoto et al. |
| 9,555,565 B2 | * | 1/2017 | Takahashi ........... B29C 45/0003 |
| 2012/0012659 A1 | * | 1/2012 | Sugimoto ............. E05B 19/046 235/492 |

FOREIGN PATENT DOCUMENTS

| CN | 108372632 | | 8/2018 | |
| JP | 2000-301578 | | 10/2000 | |
| JP | 2000301578 A | * | 10/2000 | ............. B29C 45/33 |
| JP | 2003266502 | | 9/2003 | |
| JP | 2014-008727 | | 1/2014 | |
| KR | 100838787 | * | 6/2008 | ............. B29C 45/14 |
| KR | 10-2012-0006949 | | 1/2012 | |

* cited by examiner

*Primary Examiner* — Arrie L Reuther
*Assistant Examiner* — Shibin Liang
(74) *Attorney, Agent, or Firm* — NSIP Law

(57) ABSTRACT

An apparatus for manufacturing a vehicle card key includes: an upper mold which is disposed on a printed circuit board (PCB) substrate of a vehicle card key; a lower mold which is fixed to a lower portion of the PCB substrate; a keyhole slide which is disposed between one end of the upper mold and the lower mold and forms a keyhole; a battery hole slide which is disposed between the other end of the upper mold and the lower mold and forms a battery hole; a first angular pin which passes through the one end of the upper mold and one end of the keyhole slide and the lower mold; and a second angular pin which passes through the other end of the upper mold and the other end of the battery hole slide and the lower mold.

8 Claims, 8 Drawing Sheets

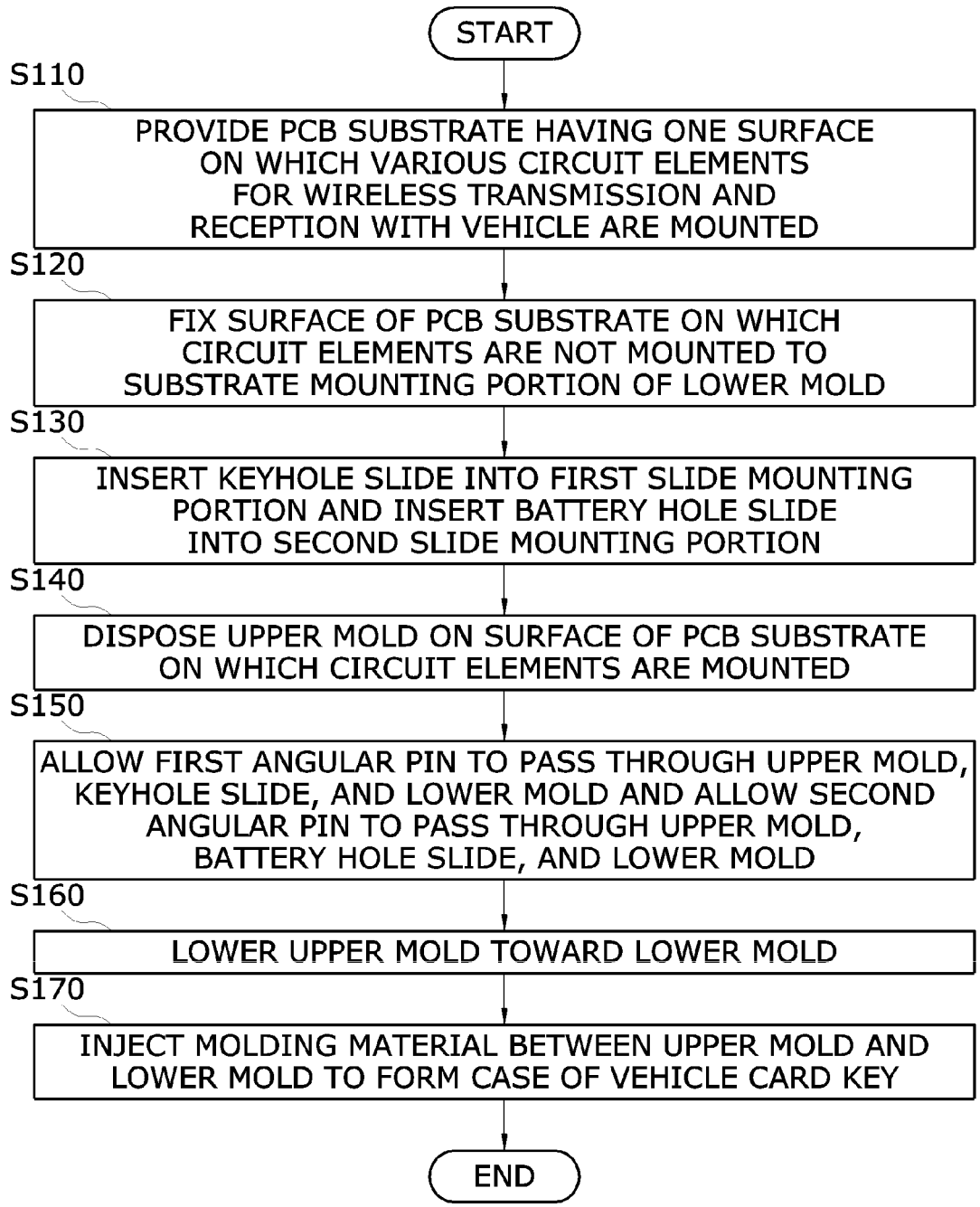

APPARATUS FOR MANUFACTURING VEHICLE CARD KEY AND METHOD OF MANUFACTURING VEHICLE CARD KEY USING THE SAME

CROSS-REFERENCE TO RELATED APPLICATION

This application claims priority from and the benefit of Korean Patent Application No. 10-2018-0105846, filed on Sep. 5, 2018, which is hereby incorporated by reference for all purposes as if fully set forth herein.

BACKGROUND

Field

Exemplary embodiments relate to an apparatus for manufacturing a vehicle card key and a method of manufacturing a vehicle card key using the same, and more particularly, to an apparatus for manufacturing a vehicle card key, which is capable of reducing a manufacturing defect rate of a vehicle card key when the vehicle card key is manufactured, and a method of manufacturing a vehicle card key using the same.

Discussion of the Background

In general, vehicle card keys of smart key systems are provided with wireless transceivers.

The vehicle card key may be carried by a user, and when the user gets into a vehicle, the vehicle card key may communicate with a controller disposed in the vehicle to unlock a vehicle door, start an engine, or perform other operations.

The vehicle card key includes a circuit board for mounting a circuit unit in a resin case and a battery serving as a power source.

The wireless transceiver includes a mechanical key stored therein, which is used in case of an unexpected situation in which the wireless transceiver may not be used due to a discharged battery or damage to the transceiver.

The mechanical key is accommodated in a separate accommodation space in the resin case.

In an emergency, the mechanical key is taken out from the accommodation space of the resin case by the user and is used to unlock a door or perform other operations.

Recently, as a more complicated and sophisticated system including more components is being used, a wireless transceiver in a vehicle card key has been required to have a volume thereof considerably reduced so that a user of the wireless transceiver conveniently carries the wireless transceiver.

To this end, conventionally, when a vehicle card key is manufactured, a component non-mounting surface of a printed circuit board (PCB) substrate, on which components are not mounted, is pressed against and fixed to a lower plate of a mold, a preset space is formed on a component mounting surface of the PCB substrate, on which components are mounted, the lower plate is covered with an upper plate of the mold, and a molding material is injected into the preset space, thereby forming a case.

In order for a mechanical key or a battery to be accommodated in the case and be electrically connected to the PCB substrate, a mechanical keyhole slide or a battery hole slide is coupled to the PCB substrate, and then, the case is molded to form a mechanical keyhole or a battery hole.

On the other hand, the mechanical keyhole slide or the battery hole slide is engaged and coupled to a latch.

The latch is formed on the lower plate of the mold and protrudes from an upper portion of the PCB substrate through a through-hole of the PCB substrate.

Accordingly, conventionally, the case is molded into a shape in which the mechanical keyhole slide or the battery hole slide is engaged with the latch, and thus, the precision of the mold should be very high. In addition, during molding, when the mechanical keyhole slide or the battery hole slide is engaged with the latch, a bonding surface of the latch or the slide is often broken. The latch and the slide are misaligned with each other, which is a main cause of a lifting phenomenon of the PCB substrate.

The above information disclosed in this Background section is only for enhancement of understanding of the background of the invention and, therefore, it may contain information that does not constitute prior art.

SUMMARY

Exemplary embodiments of the present invention provide an apparatus for manufacturing a vehicle card key, which is capable of reducing a manufacturing defect rate of a vehicle card key when the vehicle card key is manufactured, and a method of manufacturing a vehicle card key using the same.

According to an aspect of the present invention, there is provided an apparatus for manufacturing a vehicle card key, the apparatus including an upper mold which is disposed on a printed circuit board (PCB) substrate of a vehicle card key; a lower mold which is spaced a distance from the upper mold in a downward direction and fixed to a lower portion of the PCB substrate; a keyhole slide which is disposed between one direction ends of the upper mold and the lower mold and forms a keyhole into which a mechanical key of the vehicle card key is inserted; a battery hole slide which is disposed between the other direction ends of the upper mold and the lower mold and forms a battery hole into which a battery of the vehicle card key is inserted; a first angular pin which passes through the one direction end of the upper mold and one direction ends of the keyhole slide and the lower mold; and a second angular pin which passes through the other direction end of the upper mold and the other direction ends of the battery hole slide and the lower mold.

The lower mold may include a substrate mounting portion which is disposed on an upper surface of a central region of the lower mold and on which the PCB substrate is mounted, a first slide mounting portion which is disposed on an upper surface of the one direction end of the lower mold with respect to the substrate mounting portion and on which the keyhole slide is mounted, and a second slide mounting portion which is disposed on an upper surface of the other direction end of the lower mold with respect to the substrate mounting portion and on which the battery hole slide is mounted.

The first slide mounting portion may include a first bottom surface with which a lower surface of the keyhole slide is in contact, first inner surfaces which extend from the first bottom surface and with which both side surfaces of the keyhole slide are in contact, first stoppers which extend from the first bottom surface and with which a surface of the keyhole slide, which faces a direction in which the battery hole slide is disposed, optionally comes into contact, and first guide grooves which are formed in the first inner surfaces in a longitudinal direction thereof and prevent the keyhole slide from deviating upward.

The second slide mounting portion may include a second bottom surface with which a lower surface of the battery hole slide is in contact, second inner surfaces which extend from the second bottom surface and with which both side surfaces of the battery hole slide are in contact, second stoppers which extend from the second bottom surface and with which a surface of the battery hole slide, which faces a direction in which the keyhole slide is disposed, optionally comes into contact, and second guide grooves which are formed in the second inner surfaces in a longitudinal direction thereof and prevent the battery hole slide from deviating upward.

The keyhole slide may include a first body which is slidably mounted on the first slide mounting portion, first guide protrusions which are formed at positions corresponding to the first guide grooves at both side surfaces of the first body and which are slidably coupled to the first guide grooves, a first protrusion which protrudes from the other surface of the first body and has a width smaller than a width of the first body, and first contact portions which are formed between the both side surfaces of the first body and the first protrusion and optionally come into contact with the first stoppers.

The battery hole slide may include a second body which is slidably mounted on the second slide mounting portion, second guide protrusions which are formed at positions corresponding to the second guide grooves at both side surfaces of the second body and which are slidably coupled to the second guide grooves, a second protrusion which protrudes from one surface of the second body and has a width smaller than a width of the second body; and second contact portions which are formed between the both side surfaces of the second body and the second protrusion and optionally come into contact with the second stoppers.

The upper mold may have a first upper through-hole formed in the one direction end, through which the first angular pin passes, and a second upper through-hole formed in the other direction end, through which the second angular pin passes, the keyhole slide may have a first through-hole through which the first angular pin passing through the first upper through-hole passes, the battery hole slide may have a second through-hole through which the second angular pin passing through the second upper through-hole passes, and the lower mold may have a first lower through-hole through which the first angular pin passing through the first through-hole passes and a second lower through-hole through which the second angular pin passing through the second through-hole passes.

The first angular pin and the second angular pin may be inclined such that a distance between the first angular pin and the second angular pin is gradually increased in a direction from top to bottom.

The first lower through-hole and the second lower through-hole may be formed as long holes.

When the upper mold is lowered, the first angular pin and the second angular pin may be moved to an inward direction from an outward direction in the first lower through-hole and the second lower through-hole, and the keyhole slide and the battery hole slide may be slid in directions in which the keyhole slide and the battery hole slide face each other along the first angular pin and the second angular pin.

According to another aspect of the present invention, there is provided a method of manufacturing a vehicle card key using an apparatus for manufacturing a vehicle card key, the method including providing a PCB substrate which has one surface on which various circuit elements for wireless transmission and reception with a vehicle are mounted and the other surface on which circuit elements are not mounted; fixing the other surface, on which the circuit elements are not mounted, of the PCB substrate to a substrate mounting portion of a lower mold; inserting a keyhole slide into a first slide mounting portion formed on one direction end of the lower mold and inserting a battery hole slide into a second slide mounting portion formed on the other direction end of the lower mold, wherein the keyhole slide forms a keyhole into which a mechanical key of a vehicle card key is inserted in the PCB substrate and the battery hole slide forms a battery hole into which a battery is inserted; disposing an upper mold on the one surface of the PCB substrate on which the circuit elements are mounted; allowing a first angular pin to pass through the one direction end of the upper mold and one direction ends of the keyhole slide and the lower mold and allowing a second angular pin to pass through the other direction end of the upper mold and the other direction ends of the battery hole slide and the lower mold; lowering the upper mold; injecting a molding material into a space between the upper mold and the lower mold to form a case of the vehicle card key; and curing and taking out the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 is a flowchart illustrating a method of manufacturing a vehicle card key using an apparatus for manufacturing a vehicle card key according to an embodiment of the present invention.

DETAILED DESCRIPTION

Figure 1:
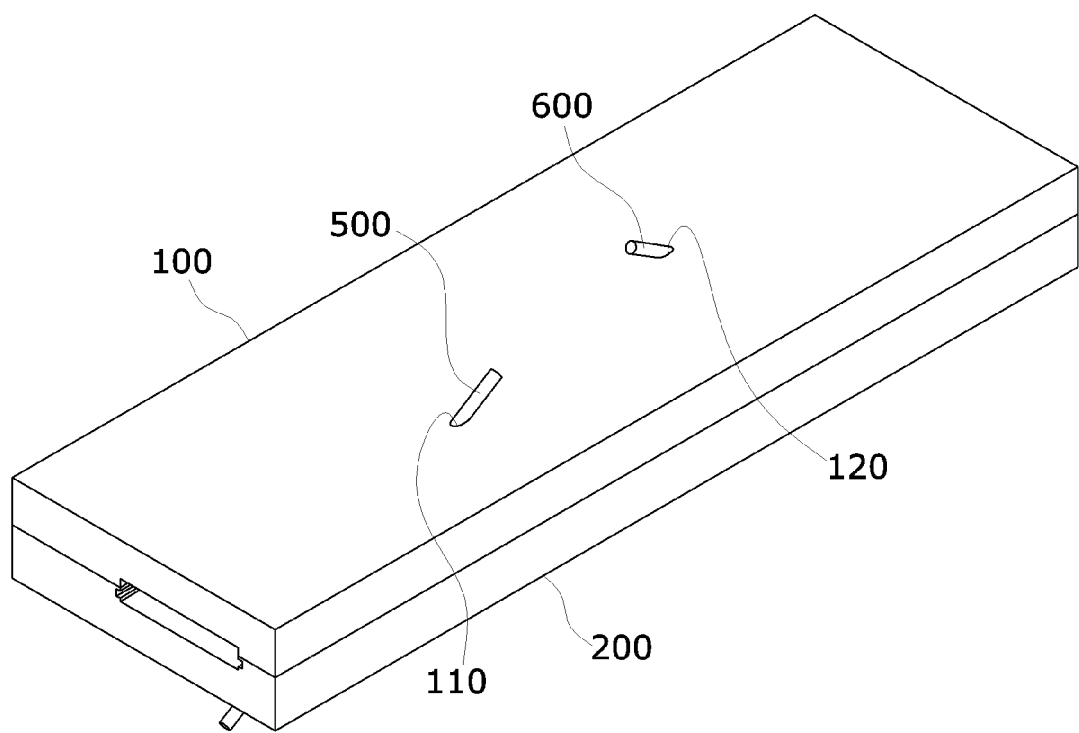
FIG. 1 is a perspective view illustrating an apparatus for manufacturing a vehicle card key according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Advantages and features of the present invention, and methods for accomplishing the same will be more clearly understood from exemplary embodiments described below with reference to the accompanying drawings. The present invention is not limited to the following embodiments but includes various applications and modifications. The present embodiments will make the disclosure of the present invention complete, and allow those skilled in the art to completely comprehend the scope of the present invention. The present invention is only defined within the scope of accompanying claims. Terms used in this specification are to describe the embodiments and are not intended to limit the present invention. As used herein, singular expressions, unless defined otherwise in contexts, include plural expressions. It will be further understood that the terms "comprises," "comprising," "includes," and/or "including," if used herein, specify the presence of stated components, steps, operations, and/or elements, but do not preclude the presence or addition of one or more other components, steps, operations, and/or elements. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in detail with reference to the accompanying drawings.

Figure 2:
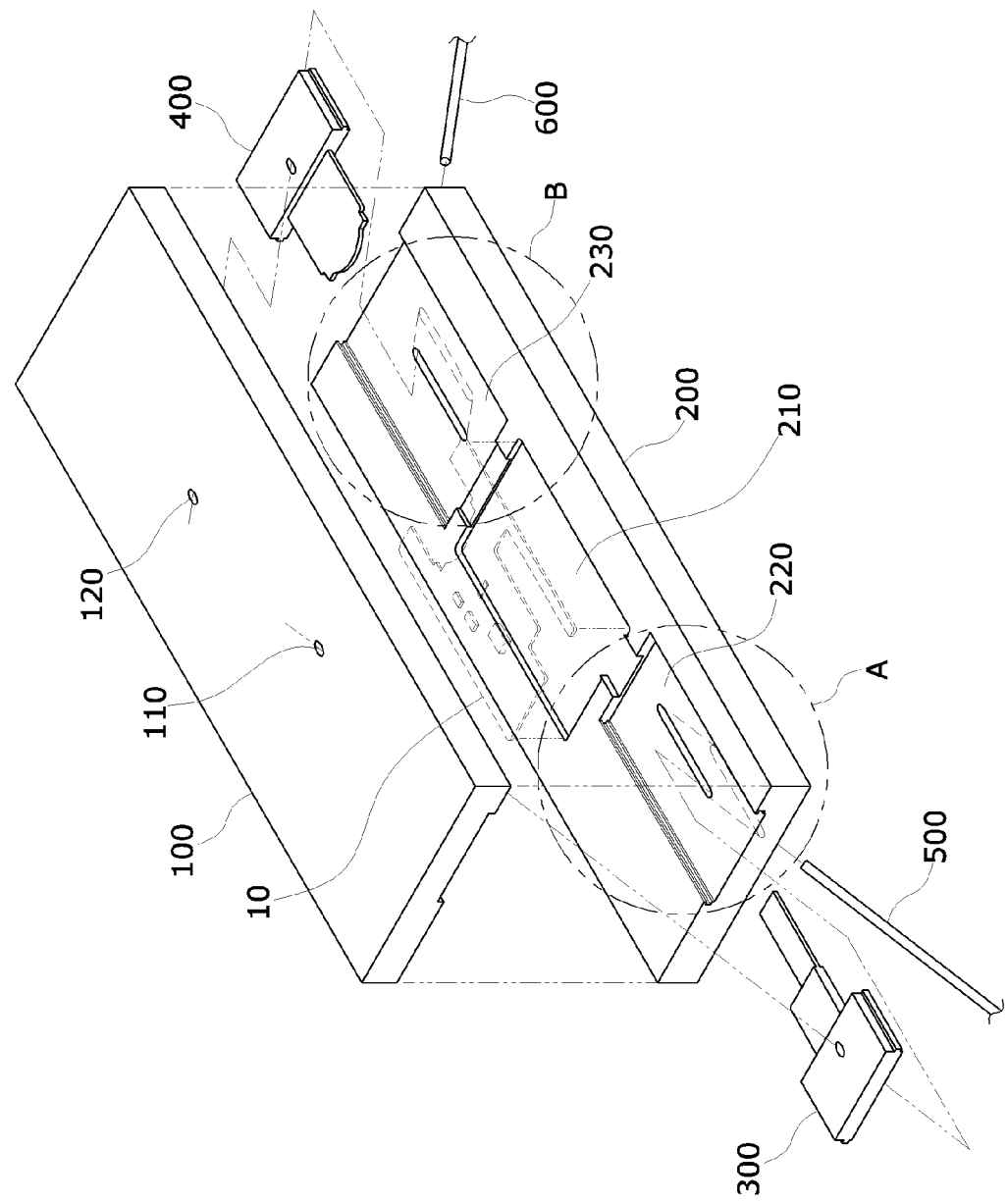
FIG. 2 is an exploded perspective view illustrating the apparatus for manufacturing the vehicle card key according to the embodiment of the present invention.
Figure 3:
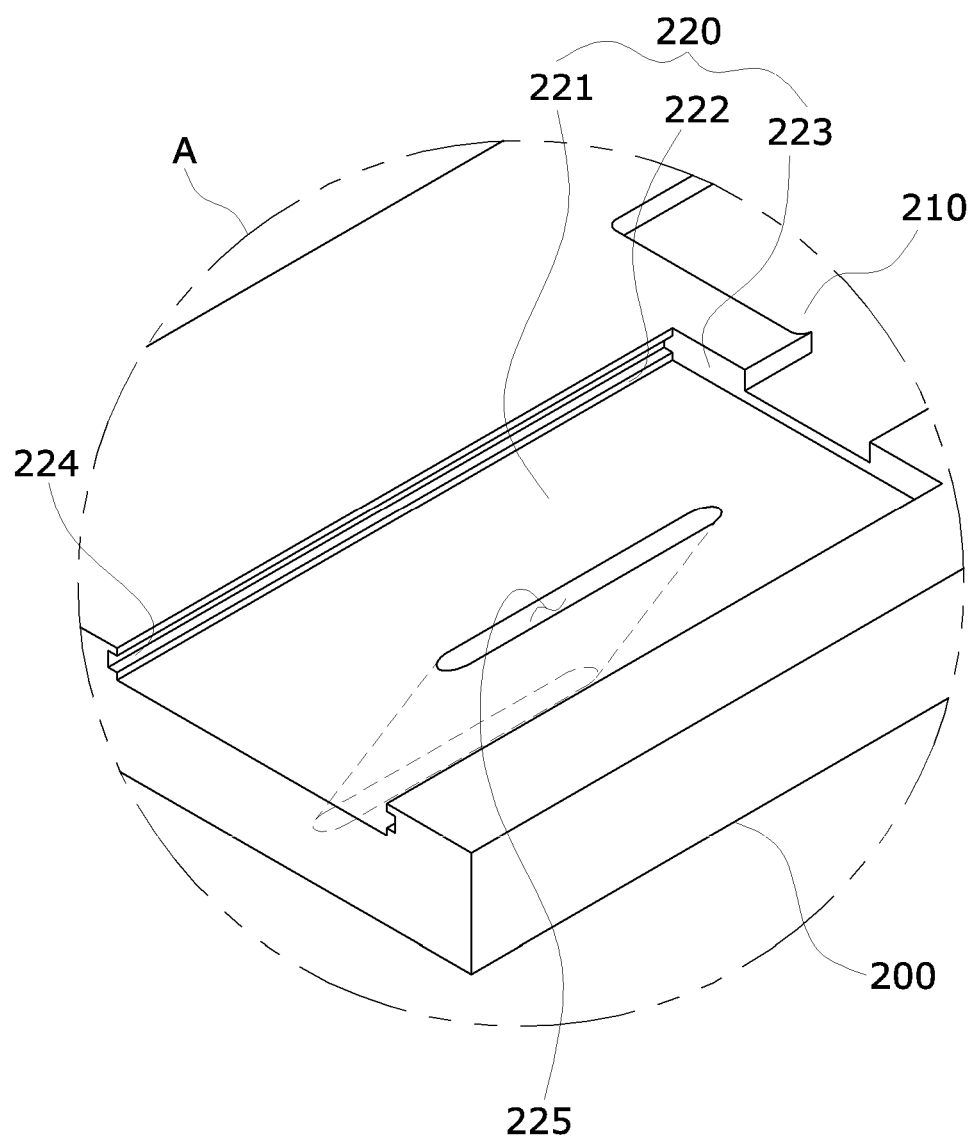
FIG. 3 is an enlarged view illustrating portion A shown in FIG. 2.
Figure 4:
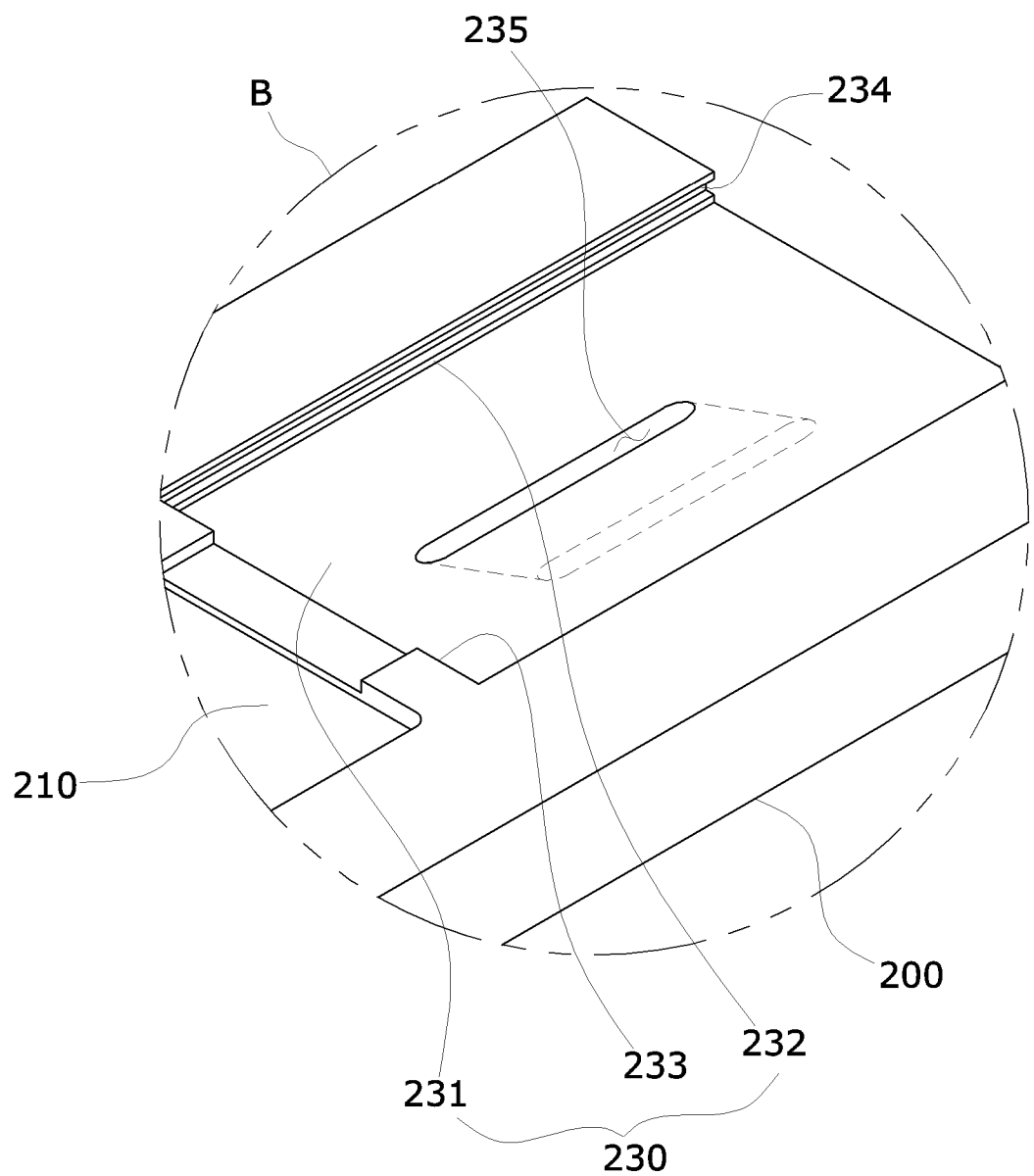
FIG. 4 is an enlarged view illustrating portion B shown in FIG. 2.
Figure 5A:
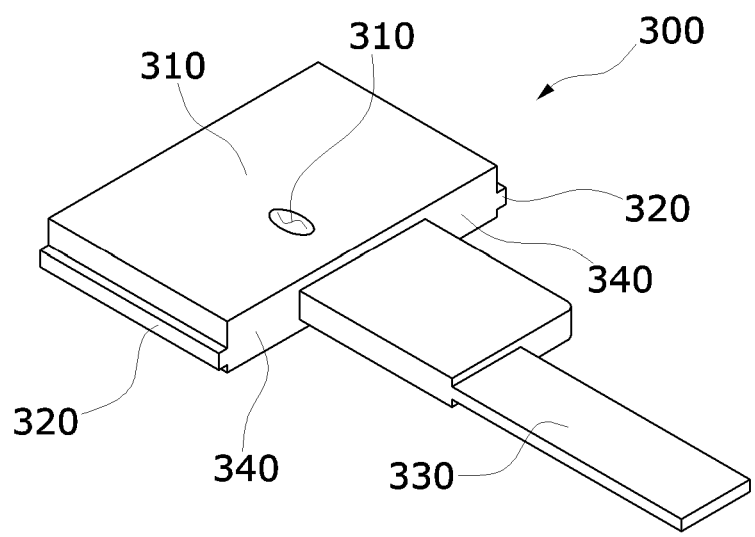
FIG. 5A is a perspective view illustrating a keyhole slide of a vehicle card key according to an embodiment of the present invention.
Figure 5B:
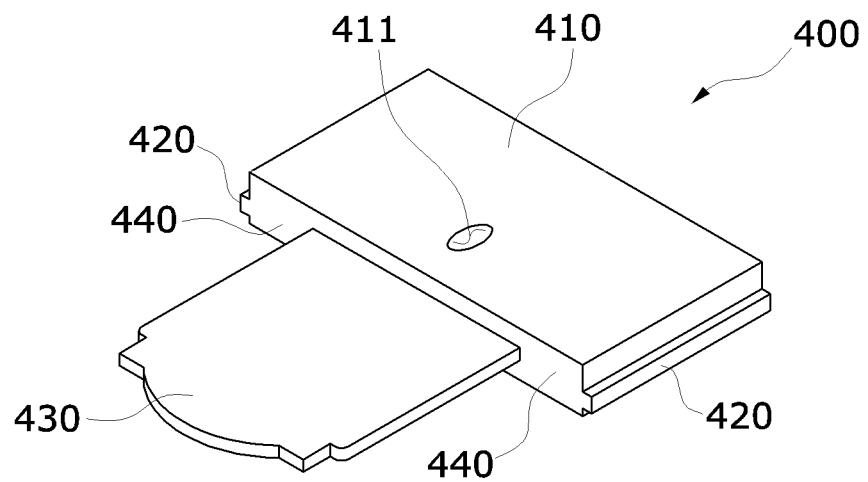
FIG. 5B is a perspective view illustrating a battery hole slide of the vehicle card key according to the embodiment of the present invention.

FIG. 1 is a perspective view illustrating an apparatus for manufacturing a vehicle card key according to an embodiment of the present invention. FIG. 2 is an exploded perspective view illustrating the apparatus for manufacturing the vehicle card key according to the embodiment of the present invention. FIG. 3 is an enlarged view illustrating portion A shown in FIG. 2. FIG. 4 is an enlarged view illustrating portion B shown in FIG. 2. FIG. 5A is a perspective view illustrating a keyhole slide of a vehicle card key according to an embodiment of the present invention. FIG. 5B is a perspective view illustrating a battery hole slide of the vehicle card key according to the embodiment of the present invention. FIGS. 6A to 7B are operational views illustrating an operation state of the apparatus for manufacturing the vehicle card key according to the embodiment of the present invention.

Referring to FIGS. 1 to 7B, the apparatus for manufacturing the vehicle card key according to the embodiment of the present invention, which manufactures a vehicle card key, includes an upper mold 100, a lower mold 200, a keyhole slide 300, a battery hole slide 400, a first angular pin 500, and a second angular pin 600.

As shown in FIG. 2, the upper mold 100 is used to mold a case of a vehicle card key and is disposed on a printed circuit board (PCB) substrate 10 of the vehicle card key.

The lower mold 200 is used to mold the case of the vehicle card key together with the upper mold 100. The lower mold 200 is spaced a distance from the upper mold 100 in a downward direction and is fixed to the PCB substrate 10 of the vehicle card key.

The lower mold 200 includes a substrate mounting portion 210, a first slide mounting portion 220, and a second slide mounting portion 230.

The substrate mounting portion 210 is formed in a central region of the lower mold 200 and is a region in which the PCB substrate 10 is mounted.

On the other hand, the PCB substrate 10 has one surface, on which various circuit elements for wireless transmission and reception with a vehicle are mounted, and the other surface on which circuit elements are not mounted.

The surface of the PCB substrate 10 on which the circuit elements are not mounted is mounted on the substrate mounting portion 210.

That is, since the surface of the PCB substrate 10 on which the circuit elements are not mounted is mounted on the substrate mounting portion 210, when a molding material for manufacturing the case of the vehicle card key is injected into a space between the upper mold 100 and the lower mold 200, while a region of the substrate mounting portion 210 is filled with the molding material, various circuit elements of the PCB substrate 10 are sealed.

Meanwhile, the molding material may include an epoxy molding compound (EMC).

The EMC is a plastic material used to protect chips and circuits inside a semiconductor from various external environmental factors such as moisture, an impact, and oxidation. The EMC may be a composite material including ten kinds of raw materials such as silica, an epoxy resin, a phenol resin, carbon black, and a flame retardant and may implement high productivity and stability and a reduction in manufacturing cost.

The first slide mounting portion 220 is a region in which the keyhole slide 300 is mounted and is formed on an upper surface of one direction end of the lower mold 200 with respect to the substrate mounting portion 210.

As shown in FIG. 3, the first slide mounting portion 220 includes a first inner surface 222, a first bottom surface 221, a first stopper 223, and a first guide groove 224.

When the keyhole slide 300 is mounted on the first slide mounting portion 220, a lower surface of the keyhole slide 300 is in contact with the first bottom surface 221.

The first inner surfaces 222 extend upward from both side surfaces of the first bottom surface 221. When the keyhole slide 300 is mounted on the first slide mounting portion 220, both side surfaces of the keyhole slide 300 are in contact with the first inner surfaces 222.

The first inner surfaces 222 are formed to be spaced apart from each other by a distance equal to a width of the keyhole slide 300.

As a result, the first inner surfaces 222 may prevent the keyhole slide 300 from being shaken due to gaps generated between the first inner surfaces 222 and the both side surfaces of the keyhole slide 300 mounted on the first slide mounting portion 220.

As shown in FIG. 3, the first stoppers 223 extend upward from the first bottom surface 221 and are formed to extend from the first inner surfaces 222 in a direction in which the first stoppers 223 face each other between the substrate mounting portion 210 and the first inner surfaces 222.

The first stopper 223 optionally comes into contact with the other surface of the keyhole slide 300 mounted on the first slide mounting portion 220 in which the other surface of the keyhole slide 300 faces a direction in which the battery hole slide 400 is disposed.

Therefore, when the keyhole slide 300 slides toward the other direction end, the other surface of the keyhole slide 300 may come into contact with the first stopper 223, thereby restricting the keyhole slide 300 from excessively sliding toward the other direction end.

In addition, the first stoppers 223 may extend from a pair of first inner surfaces 222 in the direction in which the first stoppers 223 face each other and may be formed integrally with the first bottom surface 221, thereby preventing the keyhole slide 300 from being damaged due to excessive sliding of the keyhole slide 300 when the other surface of the keyhole slide 300 comes into contact with the first stopper 223.

As shown in FIG. 3, the first guide groove 224 is formed in the first inner surface 222 in a longitudinal direction thereof. The first guide groove 224 prevents the keyhole slide 300 mounted on the first slide mounting portion 220 from deviating upward and allows the keyhole slide 300 to easily slide along the first inner surfaces 222.

The second slide mounting portion 230 is a region in which the battery hole slide 400 is mounted and is formed on an upper surface of the other direction end of the lower mold 200 with respect to the substrate mounting portion 210.

The second slide mounting portion 230 includes a second inner surface 232, a second bottom surface 231, a second stopper 233, and a second guide groove 234.

When the battery hole slide 400 is mounted on the second slide mounting portion 230, a lower surface of the battery hole slide 400 is in contact with the second bottom surface 231.

The second inner surfaces 232 extend upward from both side surfaces of the second bottom surface 231. When the battery hole slide 400 is mounted on the second slide mounting portion 230, both side surfaces of the battery hole slide 400 are in contact with the second inner surfaces 232.

The second inner surfaces 232 are formed to be spaced apart from each other by a distance equal to a width of the battery hole slide 400.

As a result, the second inner surfaces 232 may prevent the battery hole slide 400 from being shaken due to gaps generated between the second inner surfaces 232 and the both side surfaces of the battery hole slide 400 mounted on the second slide mounting portion 230.

As shown in FIG. 4, the second stoppers 233 extend upward from the second bottom surface 231 and are formed to extend from the second inner surfaces 232 in a direction in which the second stoppers 233 face each other between the substrate mounting portion 210 and the second inner surfaces 232.

The second stopper 233 optionally comes into contact with one surface of the battery hole slide 400 mounted on the second slide mounting portion 230, in which the one surface of the battery hole slide 400 faces in a direction in which the keyhole slide 300 is disposed.

Therefore, when the battery hole slide 400 slides in one direction, the one surface of the battery hole slide 400 may come into contact with the second stopper 233, thereby restricting the battery hole slide 400 from excessively sliding toward one direction end.

In addition, the second stoppers 233 may extend from a pair of second inner surfaces 232 in the direction in which the second stoppers 233 face each other and may be formed integrally with the second bottom surface 231, thereby preventing the battery hole slide 400 from being damaged due to excessive sliding of the battery hole slide 400 when the one surface of the battery hole slide 400 comes into contact with the second stopper 233.

As shown in FIG. 4, the second guide groove 234 is formed in a longitudinal direction of the second inner surface 232. The second guide groove 234 prevents the battery hole slide 400 mounted on the second slide mounting portion 230 from deviating upward and allows the battery hole slide 400 to easily slide along the second inner surfaces 232.

The keyhole slide 300 is disposed between one direction ends of the upper mold 100 and the lower mold 200 and forms a keyhole into which a mechanical key of the vehicle card key is inserted.

Specifically, the keyhole slide 300 is configured such that a molding material for manufacturing the case of the vehicle card key is injected into the space between the upper mold 100 and the lower mold 200, and when the molding material is cured, an empty space is formed in the cured case.

Accordingly, the keyhole slide 300 may easily form the keyhole, into which the mechanical key is inserted, in the PCB substrate 10.

Referring to FIG. 5A, the keyhole slide 300 includes a first body 310, a first protrusion 330, and a first contact portion 340.

The first body 310 constitutes a body of the keyhole slide 300 and is slidably mounted on the first slide mounting portion 220.

Thus, the first body 310 has a width equal to a width of the first slide mounting portion 220.

Therefore, the first body 310 mounted on the first slide mounting portion 220 may be effectively moved inside the first slide mounting portion 220 in a horizontal direction.

First guide protrusions 320 protrude from both side surfaces of the first body 310 in a longitudinal direction thereof so as to correspond to the first guide grooves 224 and are slidably coupled to the first guide grooves 224.

The first protrusion 330 protrudes from the other surface of the first body 310 and has a width smaller than the width of the first body 310.

When the keyhole slide 300 slides toward the other direction end, the first protrusion 330 passes between the first stoppers 223 and is inserted into a region of the substrate mounting portion 210.

As a result, when the molding material for molding the case is injected, the first protrusion 330 may easily form the keyhole, into which the mechanical key is inserted, in the PCB substrate 10.

The first contact portions 340 are formed between the both side surfaces of the first body 310 and both side surfaces of the first protrusion 330 and optionally come into contact with the first stoppers 223 when the keyhole slide 300 slides toward the other direction end.

That is, the first contact portion 340 may effectively restrict the keyhole slide 300 from excessively sliding toward the other direction end.

Therefore, the first contact portion 340 and the first stopper 223 optionally come into contact with each other, and the first guide protrusion 320 is slidably coupled to the first guide groove 224. Thus, the keyhole slide 300 is restricted from being moved beyond a region set in the first slide mounting portion 220.

Therefore, when the molding material for manufacturing the case of the vehicle card key is injected into the space between the upper mold 100 and the lower mold 200, the first contact portion 340, the first stopper 223, the first guide groove 224, and the first guide protrusion 320 may effectively prevent a lifting phenomenon of the PCB substrate 10 due to an erroneous movement of the keyhole slide 300, thereby reducing a manufacturing defect rate of the vehicle card key.

The battery hole slide 400 is disposed at the other direction end opposite to a direction in which the keyhole slide 300 is disposed between the upper mold 100 and the lower mold 200.

The battery hole slide 400 forms a battery hole into which a battery of the vehicle card key is inserted.

Specifically, like the keyhole slide 300, the battery hole slide 400 is configured such that the molding material for manufacturing the case of the vehicle card key is injected into the space between the upper mold 100 and the lower mold 200, and when the molding material is cured, an empty space is formed in the cured case.

Thus, the battery hole slide 400 may easily form the battery hole, into which the battery is inserted, in the PCB substrate 10.

Referring to FIG. 5B, the battery hole slide 400 includes a second body 410, a second protrusion 430, and a second contact portion 440.

The second body 410 constitutes a body of the battery hole slide 400 and is slidably mounted on the second slide mounting portion 230.

Thus, the second body 410 has a width equal to a width of the second slide mounting portion 230.

Therefore, the second body 410 mounted on the second slide mounting portion 230 may be effectively moved inside the second slide mounting portion 230 in a horizontal direction.

Second guide protrusions 420 protrude from both side surfaces of the second body 410 in a longitudinal direction thereof so as to correspond to the second guide grooves 234 and are slidably coupled to the second guide grooves 234.

The second protrusion 430 protrudes from one surface of the second body 410 and has a width smaller than the width of the second body 410.

When the battery hole slide 400 slides toward one direction end, the second protrusion 430 passes between the second stoppers 233 and is inserted into a region of the substrate mounting portion 210.

As a result, when the molding material for molding the case is injected, the second protrusion 430 may easily form the battery hole, into which the battery is inserted, in the PCB substrate 10.

The second contact portions 440 are formed between the both side surfaces of the second body 410 and both side surfaces of the second protrusion 430 and optionally come into contact with the second stoppers 233 when the battery hole slide 400 slides toward one direction end.

That is, the second contact portion 440 may effectively restrict the battery hole slide 400 from excessively sliding toward the one direction end.

Therefore, the second contact portion 440 and the second stopper 233 optionally come into contact with each other, and the second guide protrusion 420 is slidably coupled to the second guide groove 234. Thus, the battery hole slide 400 is restricted from being moved beyond a region set in the second slide mounting portion 230.

Therefore, when the molding material for manufacturing the case of the vehicle card key is injected into the space between the upper mold 100 and the lower mold 200, the second contact portion 440, the second stopper 233, the second guide groove 234, and the second guide protrusion 420 may effectively prevent a lifting phenomenon of the PCB substrate 10 due to an erroneous movement of the battery hole slide 400, thereby reducing a manufacturing defect rate of the vehicle card key.

The first angular pin 500 passes through one direction end of the upper mold 100 and one direction ends of the keyhole slide 300 and the lower mold 200.

The second angular pin 600 passes through the other direction end of the upper mold 100 and the other direction ends of the battery hole slide 400 and the lower mold 200.

Specifically, as shown in FIG. 2, the upper mold 100 has a first upper through-hole 110 formed in one direction end, through which the first angular pin 500 passes, and a second upper through-hole 120 formed in the other direction end, through which the second angular pin 600 passes.

As shown in FIGS. 2 and 5A, the first body 310 of the keyhole slide 300 has a first through-hole 311 through which the first angular pin 500 passing through the first upper through-hole 110 passes. As shown in FIGS. 2 and 5B, the second body 410 has a second through-hole 411 through which the second angular pin 600 passing through the second upper through-hole 120 passes.

In addition, as shown in FIGS. 2, 3, and 4, the lower mold 200 has a first lower through-hole 225 through which the first angular pin 500 passing through the first upper through-hole 110 and the first through-hole 311 passes and a second lower through-hole 235 through which the second angular pin 600 passing through the second upper through-hole 120 and the second through-hole 411 passes.

Figure 6A:
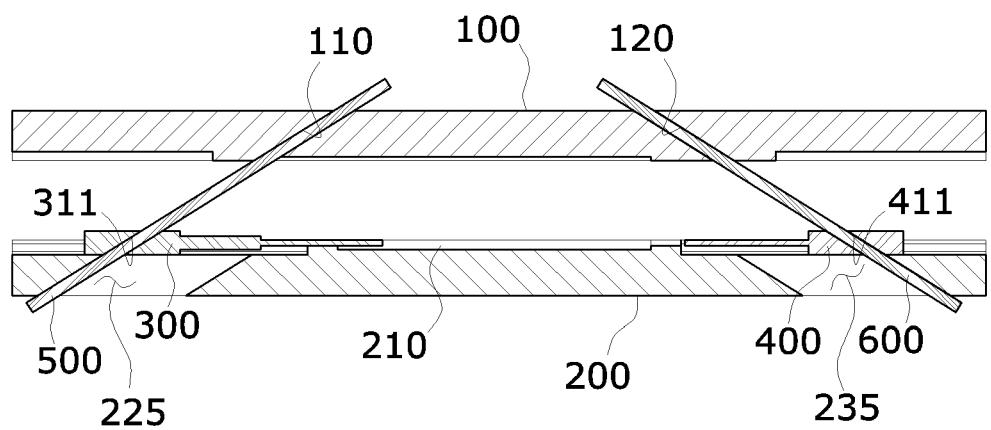
FIGS. 6A, 6B, 7A, and 7B are operational views illustrating an operation state of the apparatus for manufacturing the vehicle card key according to the embodiment of the present invention.
Figure 7A:
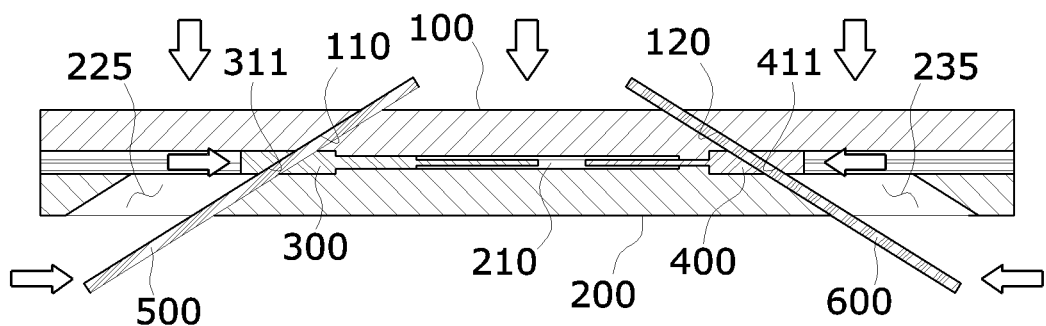

As shown in FIGS. 6A and 7A, the first angular pin 500 and the second angular pin 600 are inclined such that a distance between the first angular pin 500 and the second angular pin 600 is gradually increased in a direction from top to bottom.

The first lower through-hole 225 and the second lower through-hole 235 are formed as long holes.

Figure 6B:
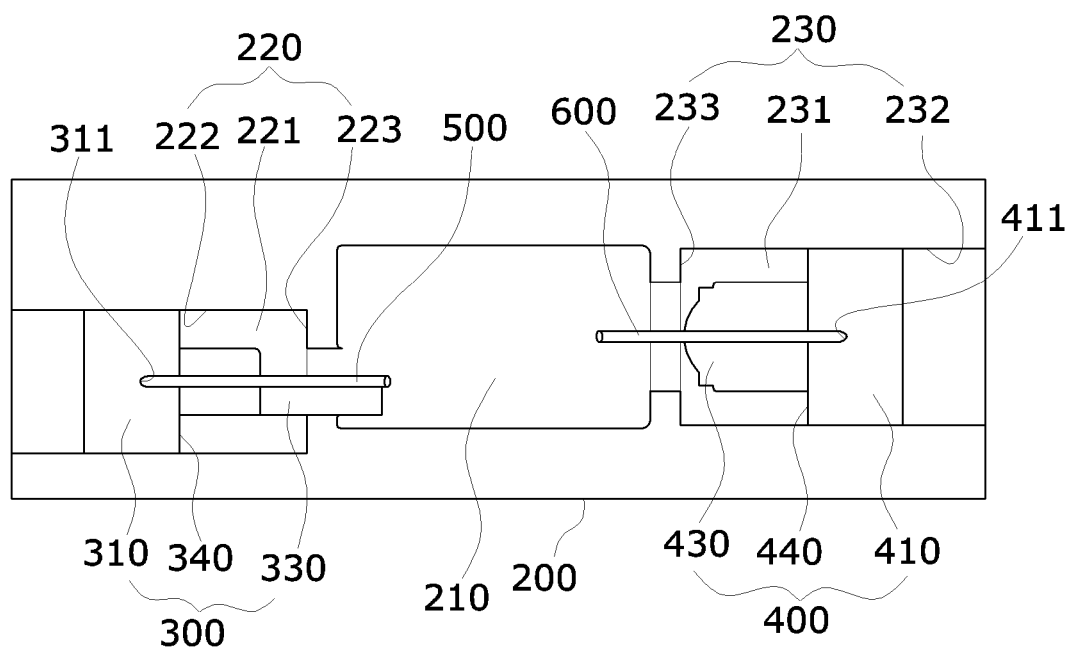

Therefore, as shown in FIGS. 6A and 6B, in an initial state in which the upper mold 100 is spaced apart from the lower mold 200, the first angular pin 500 and the keyhole slide 300 are disposed at one direction end, and the second angular pin 600 and the battery hole slide 400 are disposed at the other direction end, when the upper mold 100 is lowered to the lower mold 200 in order to inject the molding material, the first upper through-hole 110 and the second upper through-hole 120 of the upper mold 100 press and lowers each of upper ends of the first angular pin 500 and the second angular pin 600.

As a result, as shown in FIG. 7A, the first angular pin 500 and the second angular pin 600 are moved in directions in which the first angular pin 500 and the second angular pin 600 face each other along the first lower through-hole 225 and the second lower through-hole 235 formed as the long holes.

Figure 7B:
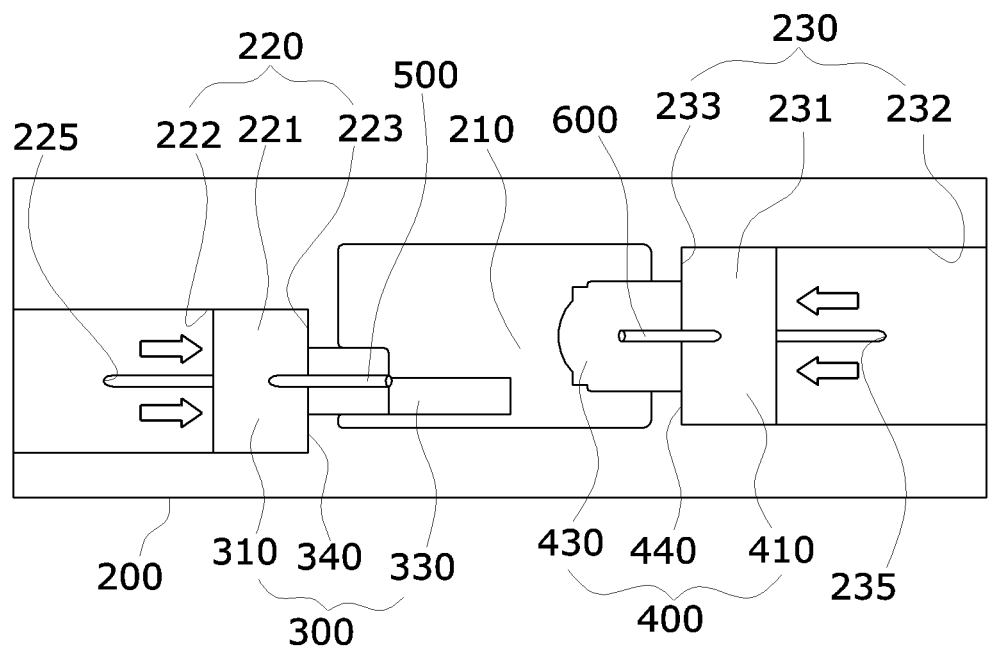

In this case, as shown in FIGS. 7A and 7B, the keyhole slide 300 and the battery hole slide 400 slide in directions in which the keyhole slide 300 and the battery hole slide 400 face each other along the first angular pin 500 and the second angular pin 600.

Therefore, the first protrusion 330 of the keyhole slide 300 and the second protrusion 430 of the battery hole slide 400 may be inserted into the regions of the substrate mounting portion 210, thereby easily forming the case in the remaining region of the PCB substrate 10 excluding a region in which the keyhole is formed and a region in which the battery hole is formed.

On the other hand, FIGS. 6B and 7B are plan views illustrating the apparatus for manufacturing the vehicle card key in a state in which the upper mold is omitted.

Hereinafter, a method of manufacturing a vehicle card key using an apparatus for manufacturing a vehicle card key according to the present invention will be described in detail with reference to the accompanying drawings.

FIG. 8 is a flowchart illustrating a method of manufacturing a vehicle card key using an apparatus for manufacturing a vehicle card key according to an embodiment of the present invention.

Referring to FIG. 8, first, the PCB substrate 10, which has one surface on which various circuit elements for wireless transmission and reception with a vehicle are mounted and the other surface on which circuit elements are not mounted, is provided (S110).

The surface of the PCB substrate 10 on which the circuit elements are not mounted is fixed to the substrate mounting portion 210 of the lower mold 200 (S120).

The keyhole slide 300, which forms a keyhole, into which a mechanical key of a vehicle card key is inserted, in the PCB substrate 10, is inserted into the first slide mounting portion 220 formed at one direction end of the lower mold 200.

The battery hole slide 400, which forms a battery hole, into which a battery of the vehicle card key is inserted, in the PCB substrate, is inserted into the second slide mounting portion 230 formed at the other direction end of the lower mold 200 (S130).

The upper mold 100 is disposed on the surface of the PCB substrate 10 on which the circuit elements are mounted (S140)

The first angular pin 500 is allowed to pass through one direction end of the upper mold 100 and one direction ends of the keyhole slide 300 and the lower mold 200. The second angular pin 600 is allowed to pass through the other direction end of the upper mold 100 and the other direction ends of the battery hole slide 400 and the lower mold 200 (S150).

When the first angular pin 500 and the second angular pin 600 are inserted into the upper mold 100, the keyhole slide 300, the battery hole slide 400, and the lower mold 200, the upper mold 100 is lowered toward the lower mold 200 (S160).

On the other hand, the first lower through-hole 225 and the second lower through-hole 235 having a long hole shape, into which the first angular pin 500 and the second angular pin 600 are inserted, are formed in the lower mold 200.

Here, when the upper mold 100 is lowered to the lower mold 200, the upper mold 100 presses and lowers each of upper ends of the first angular pin 500 and the second angular pin 600. Thus, the first angular pin 500 and the second angular pin 600 are moved in directions in which the first angular pin 500 and the second angular pin 600 face each other along the first lower through-hole 225 and the second lower through-hole 235 formed as the long holes.

When the first angular pin 500 and the second angular pin 600 are moved in the directions in which the first angular pin 500 and the second angular pin 600 face each other, the keyhole slide 300 and the battery hole slide 400 slide in directions in which the keyhole slide 300 and the battery hole slide 400 face each other along the first angular pin 500 and the second angular pin 600.

Therefore, the first protrusion 330 of the keyhole slide 300 and the second protrusion 430 of the battery hole slide 400 may be inserted into the regions of the substrate mounting portion 210, thereby easily forming the case in the remaining region of the PCB substrate 10 excluding a region in which the keyhole is formed and a region in which the battery hole is formed.

In a state in which the keyhole slide 300 and the battery hole slide 400 are mounted on the first slide mounting portion 220 and the second slide mounting portion 230, when the keyhole slide 300 and the battery hole slide 400 slide in directions in which the keyhole slide 300 and the battery hole slide 400 face each other, the first stopper 223 formed in the first slide mounting portion 220 and the keyhole slide 300 may come into contact with each other, and the second stopper 233 formed in the second slide mounting portion 230 and the battery hole slide 400 may come into contact with each other, thereby restricting the keyhole slide 300 from being excessively moved in the other direction and restricting the battery hole slide 400 from being excessively moved in one direction.

In this case, the first stoppers 223 and the second stoppers 233 may extend from a pair of first inner surfaces 222 and a pair of second inner surfaces 232 in directions in which the first stoppers 223 face each other and the second stoppers 233 face each other and may be formed integrally with the first bottom surface 221 and the second bottom surface 231, respectively, thereby firmly preventing the keyhole slide 300 and the battery hole slide 400 from being damaged due to excessive sliding of the keyhole slide 300 and the battery hold slide 400.

A molding material is injected into a space between the upper mold 100 and the lower mold 200 to form a case of the vehicle card key (S170).

As described above, in the apparatus for manufacturing the vehicle card key and the method of manufacturing the vehicle card key using the same of the present invention, the first stoppers 223, which are formed to extend upward from the first bottom surface 221 and extend from the first inner surfaces 222 in a direction in which the first stoppers 223 face each other between the substrate mounting portion 210 and the first inner surfaces 222, may optionally come into contact with the other surface of the keyhole slide 300. Accordingly, when the keyhole slide 300 slides in the other direction, the other surface of the keyhole slide 300 may come into contact with the first stoppers 223, whereby the first stoppers 223 may restrict the keyhole slide 300 from excessively sliding toward the other direction end.

In addition, the first stoppers 223 may extend from the pair of first inner surfaces 222 in the direction in which the first stoppers 223 face each other and may be formed integrally with the first bottom surface 221, thereby firmly preventing the keyhole slide 300 from being damaged due to excessive sliding of the keyhole slide 300 when the other surface of the keyhole slide 300 comes into contact with the first stopper 223.

When the keyhole slide 300 slides toward the other direction end, the first contact portion 340 may optionally come into contact with the first stopper 223 to effectively restrict the keyhole slide 300 from excessively sliding toward the other direction end.

In addition, the first contact portion 340 and the first stopper 223 may optionally come into contact with each other, and the first guide protrusion 320 may be slidably coupled to the first guide groove 224, and thus, the keyhole slide 300 may be restricted from being moved beyond a region set in the first slide mounting portion 220. Accordingly, when the molding material for manufacturing the case of the vehicle card key is injected into the space between the upper mold 100 and the lower mold 200, the first contact portion 340, the first stopper 223, the first guide groove 224, and the first guide protrusion 320 may effectively prevent a lifting phenomenon of the PCB substrate 10 due to an erroneous movement of the keyhole slide 300, thereby reducing a manufacturing defect rate of the vehicle card key.

Furthermore, when the first angular pin 500 and the second angular pin 600 are inclined such that a distance between the first angular pin 500 and the second angular pin 600 is gradually increased in a direction from top to bottom, the first lower through-hole 225 and the second lower through-hole 235 are formed as long holes, and the upper mold 100 is lowered to the lower mold 200 in order to inject the molding material, the first protrusion 330 of the keyhole slide 300 and the second protrusion 430 of the battery hole slide 400 may be inserted into the regions of the substrate mounting portion 210, thereby easily forming the case in the remaining region of the PCB substrate 10 excluding a region in which the keyhole is formed and a region in which the battery hole is formed.

The second stoppers 233, which are formed to extend upward from the second bottom surface 231 and extend from the second inner surfaces 232 in a direction in which the second stoppers 233 face each other between the substrate mounting portion 210 and the second inner surfaces 232, may optionally come into contact with one surface of the battery hole slide 400. Accordingly, when the battery hole slide 400 slides in one direction, one surface of the battery hole slide 400 may come into contact with the second stoppers 233, whereby the second stoppers 233 may restrict the battery hole slide 400 from excessively sliding toward the one direction end.

In addition, the second stoppers 233 may extend from the pair of second inner surfaces 232 in the direction in which the second stoppers 233 face each other and may be formed integrally with the second bottom surface 231, thereby firmly preventing the battery hole slide 400 from being damaged due to excessive sliding of the battery hole slide 400 when the one surface of the battery hole slide 400 comes into contact with the second stopper 233.

Furthermore, when the battery hole slide 400 slides toward the one direction end, the second contact portion 440 may optionally come into contact with the second stopper 233 to effectively restrict the battery hole slide 400 from excessively sliding toward the one direction end.

In addition, the second contact portion 440 and the second stopper 233 may optionally come into contact with each other, and the second guide protrusion 420 may be slidably coupled to the second guide groove 234, and thus, the battery hole slide 400 may be restricted from being moved beyond a region set in the second slide mounting portion 230. Accordingly, when the molding material for manufacturing the case of the vehicle card key is injected into the space between the upper mold 100 and the lower mold 200, the second contact portion 440, the second stopper 233, the second guide groove 234, and the second guide protrusion 420 may effectively prevent a lifting phenomenon of the PCB substrate 10 due to an erroneous movement of the battery hole slide 400, thereby reducing a manufacturing defect rate of the vehicle card key.

The present invention is not limited to the above-described embodiments and various modifications may be made without departing from the spirit and scope of the present invention.

What is claimed is:

1. An apparatus for manufacturing a vehicle card key, the apparatus comprising:
    an upper mold which is disposed on a printed circuit board (PCB) substrate of a vehicle card key;
    a lower mold which is spaced apart from the upper mold in a downward direction and fixed to a lower portion of the PCB substrate;
    a keyhole slide molding material which is disposed between one end of the upper mold and the lower mold and forms a keyhole into which a mechanical key of the vehicle card key is inserted;
    a battery hole slide molding material which is disposed between an other end of the upper mold and the lower mold and forms a battery hole into which a battery of the vehicle card key is inserted;
    a first angular pin which passes through the one end of the upper mold and one end of the keyhole slide and the lower mold; and
    a second angular pin which passes through the other end of the upper mold and the other end of the battery hole slide and the lower mold,
    wherein:
    the first and second angular pins extend entirely through an upper surface of the upper mold such that inclined portions of the first and second angular pins are disposed above the upper surface of the upper mold;
    the upper mold has a first upper through-hole formed in the one end, through which the first angular pin passes, and a second upper through-hole formed in the other end, through which the second angular pin passes;
    the keyhole slide molding material has a first through-hole through which the first angular pin passing through the first upper through-hole passes;
    the battery hole slide has a second through-hole through which the second angular pin passing through the second upper through-hole passes;
    the lower mold has a first lower through-hole through which the first angular pin passing through the first through-hole passes and a second lower through-hole through which the second angular pin passing through the second through-hole passes; and
    the first lower through-hole and the second lower through-hole are formed as long holes, which, when viewed in a plan view, extend in parallel directions and are not aligned with each other in a lengthwise direction of the long holes.

2. The apparatus of claim 1, wherein the lower mold comprises a substrate mounting portion which is disposed on an upper surface of a central region of the lower mold and on which the PCB substrate is mounted,
    a first slide mounting portion which is disposed on an upper surface of the one end of the lower mold with respect to the substrate mounting portion and on which the keyhole slide molding material is mounted, and
    a second slide mounting portion which is disposed on an upper surface of the other end of the lower mold with respect to the substrate mounting portion and on which the battery hole slide is mounted.

3. The apparatus of claim 2, wherein the first slide mounting portion comprises a first bottom surface with which a lower surface of the keyhole slide molding material is in contact,
    first inner surfaces which extend from the first bottom surface and with which both side surfaces of the keyhole slide molding material are in contact,
    first stoppers which extend from the first bottom surface and with which a surface of the keyhole slide molding material comes into contact, the surface of the keyhole slide molding material faces a direction in which the battery hole slide is disposed, and
    first guide grooves which are formed in the first inner surfaces in a longitudinal direction thereof and prevent the keyhole slide molding material from deviating upward.

4. The apparatus of claim 2, wherein the second slide mounting portion comprises a second bottom surface with which a lower surface of the battery hole slide is in contact,
- second inner surfaces which extend from the second bottom surface and with which both side surfaces of the battery hole slide are in contact,
- second stoppers which extend from the second bottom surface and with which a surface of the battery hole slide comes into contact, the surface of the battery hole slide faces a direction in which the keyhole slide molding material is disposed, and
- second guide grooves which are formed in the second inner surfaces in a longitudinal direction thereof and prevent the battery hole slide from deviating upward.

5. The apparatus of claim 3, wherein the keyhole slide molding material comprises a first body which is slidably mounted on the first slide mounting portion,
- first guide protrusions which are formed at positions corresponding to the first guide grooves at both side surfaces of the first body and which are slidably coupled to the first guide grooves,
- a first protrusion which protrudes from an other surface of the first body and has a width smaller than a width of the first body, and
- first contact portions which are formed between the both side surfaces of the first body and the first protrusion and come into contact with the first stoppers.

6. The apparatus of claim 4, wherein the battery hole slide comprises a second body which is slidably mounted on the second slide mounting portion,
- second guide protrusions which are formed at positions corresponding to the second guide grooves at both side surfaces of the second body and which are slidably coupled to the second guide grooves,
- a second protrusion which protrudes from one surface of the second body and has a width smaller than a width of the second body; and
- second contact portions which are formed between the both side surfaces of the second body and the second protrusion and come into contact with the second stoppers.

7. The apparatus of claim 1, wherein the first angular pin and the second angular pin are inclined such that a distance between the first angular pin and the second angular pin is gradually increased in a direction from top to bottom.

8. The apparatus of claim 1, wherein, when the upper mold is lowered, the first angular pin and the second angular pin are moved from outside to inside of the first lower through-hole and the second lower through-hole, and
- the keyhole slide molding material and the battery hole slide are slid in directions in which the keyhole slide molding material and the battery hole slide face each other along the first angular pin and the second angular pin.

\* \* \* \* \*